US008940180B2

(12) United States Patent  (10) Patent No.: US 8,940,180 B2
Yana Motta et al.  (45) Date of Patent: Jan. 27, 2015

(54) LOW GWP HEAT TRANSFER COMPOSITIONS

(71) Applicant: Honeywell International Inc., Morristown, NJ (US)

(72) Inventors: Samuel F. Yana Motta, East Amherst, NY (US); Mark W. Spatz, East Amherst, NY (US); Elizabet Del Carmen Vera Becerra, Williamsville, NY (US); Ankit Sethi, Tonawanda, NY (US); Thomas Morris, Mendham, NJ (US)

(73) Assignee: Honeywell International Inc., Morristown, NJ (US)

( * ) Notice: Subject to any disclaimer, the term of this patent is extended or adjusted under 35 U.S.C. 154(b) by 127 days.

(21) Appl. No.: 13/796,460

(22) Filed: Mar. 12, 2013

(65) Prior Publication Data

US 2014/0137578 A1  May 22, 2014

Related U.S. Application Data

(60) Provisional application No. 61/729,291, filed on Nov. 21, 2012.

(51) Int. Cl.
*C09K 5/04* (2006.01)
*F25B 45/00* (2006.01)

(52) U.S. Cl.
CPC .............. *C09K 5/045* (2013.01); *F25B 45/00* (2013.01); *C09K 2205/126* (2013.01); *C09K 2205/22* (2013.01); *C09K 2205/40* (2013.01)
USPC ......... 252/67; 62/77; 62/502; 62/498; 62/115

(58) Field of Classification Search
CPC .......... C09K 5/045; F25B 45/00; F25B 9/006
USPC .................. 252/67; 62/77, 502, 498, 115
See application file for complete search history.

(56) References Cited

U.S. PATENT DOCUMENTS

| | | | |
|---|---|---|---|
| 7,524,805 B2 * | 4/2009 | Singh et al. ................ 510/408 |
| 7,959,825 B2 * | 6/2011 | Minor et al. ................ 252/68 |
| 8,024,937 B2 | 9/2011 | Minor |
| 8,246,850 B2 | 8/2012 | Rached |
| 8,252,198 B2 | 8/2012 | Rached |
| 8,318,647 B2 | 11/2012 | Carr et al. |
| 8,333,901 B2 | 12/2012 | Low |
| 8,709,275 B2 * | 4/2014 | Yana Motta et al. ........... 252/67 |
| 2007/0007488 A1 * | 1/2007 | Singh et al. ................ 252/68 |
| 2009/0250650 A1 * | 10/2009 | Minor et al. ................ 252/2 |
| 2009/0314015 A1 | 12/2009 | Minor et al. |
| 2010/0044619 A1 * | 2/2010 | Hulse et al. ................ 252/67 |
| 2010/0122545 A1 * | 5/2010 | Minor et al. ............. 62/324.1 |
| 2010/0137658 A1 * | 6/2010 | Merkel et al. ............. 570/175 |
| 2010/0186432 A1 | 7/2010 | Perti et al. |
| 2010/0193155 A1 | 8/2010 | Nakatani et al. |
| 2011/0006248 A1 | 1/2011 | Van Horn et al. |
| 2011/0011123 A1 | 1/2011 | Matsuura et al. |
| 2011/0012052 A1 | 1/2011 | Van Horn et al. |
| 2011/0108756 A1 | 5/2011 | Tsuchiya et al. |
| 2011/0186772 A1 | 8/2011 | Rached |
| 2011/0204279 A1 * | 8/2011 | Minor et al. ............... 252/68 |
| 2011/0219815 A1 * | 9/2011 | Yana Motta et al. ........ 62/498 |
| 2011/0253927 A1 | 10/2011 | Minor et al. |
| 2012/0087822 A1 | 4/2012 | Nakano et al. |
| 2012/0104307 A1 | 5/2012 | Bogdan et al. |
| 2012/0119136 A1 | 5/2012 | Yana Motta et al. |
| 2012/0131947 A1 | 5/2012 | Nakano et al. |
| 2012/0132848 A1 | 5/2012 | Sawada et al. |
| 2012/0151958 A1 | 6/2012 | Rached |
| 2012/0153213 A1 | 6/2012 | Rached |
| 2012/0159982 A1 | 6/2012 | Rached |
| 2012/0161063 A1 | 6/2012 | Singh |
| 2012/0161064 A1 | 6/2012 | Rached |
| 2012/0167615 A1 | 7/2012 | Rached |
| 2012/0202904 A1 | 8/2012 | Chen et al. |
| 2012/0204586 A1 | 8/2012 | Kawabe et al. |
| 2012/0216551 A1 | 8/2012 | Minor et al. |
| 2012/0223269 A1 | 9/2012 | Van Horn et al. |
| 2012/0228541 A1 | 9/2012 | Takigawa et al. |
| 2012/0255316 A1 | 10/2012 | Andre et al. |
| 2012/0298909 A1 | 11/2012 | Low |
| 2012/0304687 A1 | 12/2012 | Sato et al. |
| 2013/0015395 A1 | 1/2013 | Yana Motta et al. |
| 2013/0055738 A1 * | 3/2013 | Rached ..................... 62/114 |
| 2013/0145778 A1 * | 6/2013 | Yana Motta et al. ........... 62/77 |
| 2014/0223927 A1 * | 8/2014 | Pottker et al. ................ 62/77 |

FOREIGN PATENT DOCUMENTS

| | | | | |
|---|---|---|---|---|
| WO | WO 2006039148 A2 * | 4/2006 | | |
| WO | 2008009922 A2 | 1/2008 | | |
| WO | WO 2009151669 A1 * | 12/2009 | | |
| WO | 2010002023 A1 | 1/2010 | | |
| WO | WO 2010129920 A1 * | 11/2010 | | C09K 5/04 |
| WO | 2011101617 A2 | 8/2011 | | |
| WO | 2011101621 A2 | 8/2011 | | |
| WO | 2011141654 A2 | 11/2011 | | |
| WO | 2011141655 A2 | 11/2011 | | |
| WO | 2011141656 A2 | 11/2011 | | |
| WO | 2011161419 A1 | 12/2011 | | |
| WO | 2011163117 A1 | 12/2011 | | |
| WO | WO 2011161419 A1 * | 12/2011 | | |
| WO | 2012069725 A1 | 5/2012 | | |
| WO | 2012110801 A1 | 8/2012 | | |
| WO | 2012151238 A2 | 11/2012 | | |
| WO | WO 2013/122892 A1 * | 8/2013 | | |
| WO | WO 2014081539 A1 * | 5/2014 | | |

OTHER PUBLICATIONS

Standard Test Method for Concentration Limits of Flammability of Chemicals (Vapors and Gases), ASTM International, Designation E 681-01, published Feb. 2002. (12 pages) US.

* cited by examiner

*Primary Examiner* — Douglas Mc Ginty
(74) *Attorney, Agent, or Firm* — Colleen D. Szuch

(57) ABSTRACT

The present invention relates, in part, to heat transfer and refrigerant compositions and methods that include HFC-32; HFO-1234ze and HFC-125.

18 Claims, No Drawings

LOW GWP HEAT TRANSFER COMPOSITIONS

CROSS REFERENCES TO RELATED APPLICATIONS

The present application claims priority to U.S. Provisional Application Ser. No. 61/729,291, filed Nov. 21, 2012, the contents of which are incorporated herein by reference in its entirety.

FIELD OF THE INVENTION

This invention relates to compositions, methods and systems having utility particularly in refrigeration applications, and in particular aspects to heat transfer and refrigerant compositions useful in systems that typically utilize the refrigerant R-410A for heating and/or cooling applications.

BACKGROUND

Fluorocarbon based fluids have found widespread use in many commercial and industrial applications, including as the working fluid in systems such as air conditioning, heat pump and refrigeration systems, among other uses such as aerosol propellants, as blowing agents, and as gaseous dielectrics.

Heat transfer fluids, to be commercially viable, must satisfy certain very specific and in certain cases very stringent combinations of physical, chemical and economic properties. Moreover, there are many different types of heat transfer systems and heat transfer equipment, and in many cases it is important that the heat transfer fluid used in such systems posses a particular combination of properties that match the needs of the individual system. For example, systems based on the vapor compression cycle usually involve the phase change of the refrigerant from the liquid to the vapor phase through heat absorption at a relatively low pressure and compressing the vapor to a relatively elevated pressure, condensing the vapor to the liquid phase through heat removal at this relatively elevated pressure and temperature, and then reducing the pressure to start the cycle over again.

Certain fluorocarbons, for example, have been a preferred component in many heat exchange fluids, such as refrigerants, for many years in many applications. Fluoroalkanes, such as chlorofluoromethanes and chlorofluoroethanes, have gained widespread use as refrigerants in applications including air conditioning and heat pump applications owing to their unique combination of chemical and physical properties, such as heat capacity, flammability, stability under the conditions of operation, and miscibility with the lubricant (if any) used in the system. Moreover, many of the refrigerants commonly utilized in vapor compression systems are either single components fluids, or zeotropic, azeotropic mixtures.

Concern has increased in recent years about potential damage to the earth's atmosphere and climate, and certain chlorine-based compounds have been identified as particularly problematic in this regard. The use of chlorine-containing compositions (such as chlorofluorocarbons (CFCs), hydrochlorofluorocarbons (HCFCs) and the like) as refrigerants in air-conditioning and refrigeration systems has become disfavored because of the ozone-depleting properties associated with many of such compounds. There has thus been an increasing need for new fluorocarbon and hydrofluorocarbon compounds that offer alternatives for refrigeration and heat pump applications. By way of example, in certain aspects, it has become desirable to retrofit chlorine-containing refrigeration systems by replacing chlorine-containing refrigerants with non-chlorine-containing refrigerant compounds that will not deplete the ozone layer, such as hydrofluorocarbons (HFCs).

Another concern surrounding many existing refrigerants is the tendency of many such products to cause global warming. This characteristic is commonly measured as global warming potential (GWP). The GWP of a compound is a measure of the potential contribution to the green house effect of the chemical against a known reference molecule, namely, $CO_2$ which has a GWP=1. For example, the following known refrigerants possess the following Global Warming Potentials:

| REFRIGERANT | GWP |
| --- | --- |
| R410A | 2088 |
| R-507 | 3985 |
| R404A | 3922 |
| R407C | 1774 |

While each of the above-noted refrigerants has proven effective in many respects, these materials are become increasingly less preferred since it is frequently undesirable to use materials having GWPs greater than about 1000. A need exists, therefore, for substitutes for these and other existing refrigerants having undesirable GWPs.

There has thus been an increasing need for new fluorocarbon and hydrofluorocarbon compounds and compositions that are attractive alternatives to the compositions heretofore used in these and other applications. For example, it has become desirable to retrofit certain systems, including chlorine-containing and certain HFC-containing refrigeration systems by replacing the existing refrigerants with refrigerant compositions that will not deplete the ozone layer, will not cause unwanted levels of global worming, and at the same time will satisfy all of the other stringent requirements of such systems for the materials used as the heat transfer material.

With respect to performance properties, the present applicants have come to appreciate that that any potential substitute refrigerant must also possess those properties present in many of the most widely used fluids, such as excellent heat transfer properties, chemical stability, low- or no-toxicity, low or non-flammability and lubricant compatibility, among others.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirable for refrigerant substitutes to be effective without major engineering changes to conventional vapor compression technology currently used with existing refrigerants, such as CFC-containing refrigerants.

Flammability is another important property for many applications. That is, it is considered either important or essential in many applications, including particularly in heat transfer applications, to use compositions which are non-flammable or of relatively low flammability. As used herein, the term "nonflammable" refers to compounds or compositions which are determined to be nonflammable as determined in accordance with ASTM standard E-681, dated 2002, which is incorporated herein by reference. Unfortunately, many HFC's and HFOs which might otherwise be desirable for used in refrigerant compositions are flammable. For example, the fluoroalkane difluoroethane (HFC-152a) and the fluoroalkene 1,1,1-trifluorpropene (HFO-1243zf) are each flammable and therefore not viable for use alone in many applications.

Applicants have thus come to appreciate a need for compositions, and particularly heat transfer compositions, that are potentially useful in numerous applications, including vapor compression heating and cooling systems and methods, while avoiding one or more of the disadvantages noted above.

SUMMARY

In certain aspects, the present invention relates to compositions, methods, uses and systems which comprise or utilize a multi-component mixture comprising: (a) from about 60% to about 70% by weight of HFC-32; (b) from about 20% to about 40% by weight of HFO-1234ze; and (c) from greater than about 0% to about 10% by weight of HFC-125, provided that the amount of component (c) is effective to improve one or more of the composition's glide; heating capacity; burning velocity; and/or hazard value. Unless otherwise stated herein, weight percentage values is based on total of components (a), (b) and (c).

In certain aspects of the foregoing or any embodiment herein, component (b) may further comprise at least one compound selected from unsaturated, —CF3 terminated propenes, unsaturated, —CF3 terminated butenes, and combinations of these, wherein the compound is a compound other than HFO-1234ze.

In alternative aspects, the composition includes (a) from about 63% to about 69% by weight of HFC-32; (b) from about 25% to about 37% by weight of HFO-1234ze; and (c) from greater than about 0% to about 6% by weight of HFC-125, provided, again, that the amount of component (c) is effective to improve one or more of the composition's glide; heating capacity; burning velocity; and/or hazard value.

The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans-forms of 1,1,1,3-tetrafluoropropene respectively. The term "HFO-1234ze" therefore includes within its scope cisHFO-1234ze, transHFO-1234ze, and all combinations and mixtures of these. In certain preferred aspects, the HFO-1234ze comprises, consists essentially of, or consists of transHFO-1234ze.

The present invention provides also methods and systems which utilize the compositions of the present invention, including methods and systems for transferring heat, and methods and systems for replacing an existing heat transfer fluid in an existing heat transfer system, and methods of selecting a heat transfer fluid in accordance with the present invention to replace one or more existing heat transfer fluids. While in certain embodiments the compositions, methods, and systems of the present invention can be used to replace any known heat transfer fluid, in further, and in some cases preferred embodiments, the compositions of the present application may be used as a replacement for R-410A.

Refrigeration systems contemplated in accordance with the present invention include, but are not limited to, automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, heat pump systems, and combinations of two or more of these. In certain preferred embodiments, the refrigeration systems include stationary refrigeration systems and heat pump systems or any system where R-410A is used as the refrigerant.

DETAILED DESCRIPTION OF PREFERRED EMBODIMENTS

R-410A is commonly used in air conditioning systems, particularly stationary air conditioning units, stationary refrigeration units, and heat pump systems. It has an estimated Global Warming Potential (GWP) of 2088, which is much higher than is desired or required. Applicants have found that the compositions of the present invention satisfy in an exceptional and unexpected way the need for new compositions for such applications, particularly though not exclusively air conditioning and heat pump systems, having improved performance with respect to environmental impact while at the same time providing other important performance characteristics, such as, but not limited to, capacity, efficiency, flammability and toxicity. In preferred embodiments the present compositions provide alternatives and/or replacements for refrigerants currently used in such applications, particularly and preferably R-410A, that at once have lower GWP values and have a close match in heating and cooling capacity to R-410A in such systems.

Heat Transfer Compositions

The compositions of the present invention are generally adaptable for use in heat transfer applications, that is, as a heating and/or cooling medium, but are particularly well adapted for use, as mentioned above, in AC and heat pump systems that have heretofor used R-410A.

Applicants have found that use of the components of the present invention within the stated ranges is important to achieve the important but difficult to achieve combinations of properties exhibited by the present compositions, particularly in the preferred systems and methods.

In certain embodiments, the HFC-32 is present in the compositions of the invention in an amount of from about 60 wt. % to about 70 wt. % by weight. In certain preferred embodiments, the HFC-32 is present in the compositions of the invention in an amount of from about 63 wt. % to about 69 wt. % by weight.

In further embodiments, the second component includes HFO-1234ze, preferably from about 20 wt. % to about 40 wt.% by weight. In further embodiments, HFO-1234ze is provided in an amount from about 25 wt. % to about 37 wt.% by weight. In certain embodiments, the second component consists essentially of, or consists of, HFO-1234ze, and in further embodiments it comprises, consists essentially of, or consists of transHFO-1234ze. This second component may also include one or more additional compounds, other than HFO-1234ze, which may be selected from unsaturated —CF3 terminated propenes, unsaturated —CF3 terminated butenes, and combinations of these.

In even further embodiments, the compositions of the invention include HFC-125 in an amount from greater than about 0 wt. % to about 10 wt. %. In further embodiments, HFC-125 is provided in an amount from greater than about 0 wt. % to about 6 wt. %. In further embodiments, the compositions of the present invention may include from about 1% to about 8% by weight of HFC-125; from about 1% to about 6% by weight of HFC-125; from about 2% to about 8% by weight of HFC-125; from about 2% to about 6% by weight of HFC-125; from about 3% to about 8% by weight of HFC-125; and from about 3% to about 6% by weight of HFC-125.

In certain preferred aspects, the compositions of the present invention do not include any substantial amount of R-134a, and in certain preferred embodiments does not include more than about 0.5% of R-134a and in other preferred embodiments does not include more than trace amounts of R-134a. R-134a is not preferred, at least in part, in certain of these embodiments because it increases the GWP of the composition and does not significantly improve the performance of the composition.

In further aspects of the invention, Applicants have surprisingly and unexpectedly found that the inclusion of HFC-125 in the compositions of the present invention decreases the resulting glide and improves heating capacity at low temperature conditions. As used herein, "glide" refers to the difference between the starting and ending temperatures of a phase-change process by a refrigerant within a refrigerating system. An increase in glide typically forces the system to work at lower suction pressures, which results in a decrease in performance. Applicants demonstrate herein, however, that the addition of HFC-125 to compositions including HFO-1234 and HFC-32 in accordance with the preferred aspects of the present invention surprisingly and unexpectedly decreases composition glide, thus improving system capacity.

Applicants have also found that the inclusion of HFC-125 in accordance with the preferred aspects of the present invention provides surprising and unexpected improvement of flammability and hazard values to the resulting composition. As demonstrated in the examples, below, compositions having HFC-125 in accordance with the preferred aspects of the present invention exhibited burn velocities below those compositions lacking this component. Significantly (and also unexpectedly), the burning velocities observed were much lower than the expected values, based on known calculations. Applicants have similarly demonstrated that the inclusion of HFC-125 in accordance with the preferred aspects of the present invention lowers the hazard value of the composition, as demonstrated by the Cube Test performed and described in Example 3.

The compositions of the present invention are also advantageous as having low GWP. By way of non-limiting example, the following Table A illustrates the substantial GWP superiority of certain compositions of the present invention, which are described in parenthesis in terms of weight fraction of each component, in comparison to the GWP of R-410A, which has a GWP of 2088.

TABLE A

| Name | Composition | GWP | GWP % R410A |
|------|-------------|-----|-------------|
| 410A | R32/R125 (50/50) | 2088 | |
| A | R32/1234ze(E)/(0.68/0.32) | 461 | 22% |
| B | R32/1234ze(E)/R125(0.68/0.26/0.06) | 669 | 32% |
| C | R32/1234ze(E)/R125(0.68/0.28/0.04) | 600 | 29% |

The compositions of the present invention may include other components for the purpose of enhancing or providing certain functionality to the composition, or in some cases to reduce the cost of the composition. For example, heat transfer compositions which include the preferred compositions of the present invention as a refrigerant, especially as a refrigerant used in vapor compression systems, will also include one or more lubricants, generally in amounts of from about 30 to about 50 percent by weight of the entire heat transfer composition, and in some case potentially in amount greater than about 50 percent and other cases in amounts as low as about 5 percent by weight of the entire heat transfer composition.

Applicants have found that Polyol Esters (POEs) and Poly Vinyl Ethers (PVEs), PAG oils, silicone oil, lubricants that have been used in refrigeration machinery with previously used hydrofluorocarbon (HFC) refrigerants may, in certain embodiments, be used to advantage in the heat transfer compositions of the present invention. Commercially available esters include neopentyl glycol dipelargonate, which is available as Emery 2917 (registered trademark) and Hatcol 2370 (registered trademark). Other useful esters include phosphate esters, dibasic acid esters, and fluoroesters. Preferred lubricants include POEs and PVEs. Of course, different mixtures of different types of lubricants may be used.

Heat Transfer Methods and Systems

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. Generally speaking, such refrigeration systems contemplated in accordance with the present invention include, but are not limited to, automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, heat pump systems, and combinations of two or more of these.

In certain preferred embodiments, the compositions of the present invention are used in refrigeration systems originally designed for use with an HCFC refrigerant, such as, for example, R-410A. Such refrigeration systems may include, but are not limited to, stationary refrigeration systems and heat pump systems or any system where R-410A is used as the refrigerant.

The preferred compositions of the present invention tend to exhibit many of the desirable characteristics of R-410A but have a GWP that is substantially lower than that of R-410A while at the same time having a capacity that is substantially similar to or substantially matches, and preferably is as high as or higher than R-410A. In particular, applicants have recognized that certain preferred embodiments of the present compositions tend to exhibit relatively low global warming potentials ("GWPs"), preferably less than about 1500, preferably not greater than 1000, and more preferably not greater than about 700. Applicants have also surprisingly and unexpectedly recognized that such compositions have significantly reduced flammability and hazard values.

As mentioned above, the present invention achieves exceptional advantages in connection with commercial refrigeration systems, and in certain preferred aspects stationary refrigeration systems. Non-limiting examples of such stationary refrigeration systems are provided in Examples 4 and 5, below. To this end, such systems may include low temperature commercial applications (Example 5), including commercial freezers or systems that may be used for the storage and maintenance of frozen goods. They may also include medium-temperature commercial application (Example 4), such as commercial refrigerators, including systems for the storage of fresh goods. The examples below provide typical conditions and parameters that are used for such applications. These conditions, however, are not considered limiting to the invention, as one of skill in the art will appreciate that they may be varied based on one or more of a myriad of factors, including but not limited to, ambient conditions, intended application, time of year, and the like. Such examples are also not necessarily limiting to the definition of the term "stationary refrigeration." The compositions provided herein may be used in similar type systems or, in certain embodiments, in any alternative system where R-410A is or may be adapted for use as a refrigerant.

It is contemplated that in certain embodiments the present invention provides retrofitting methods which comprise replacing at least a substantial portion of the heat transfer fluid (including the refrigerant and optionally the lubricant) in an existing system with a composition of the present invention, without substantial modification of the system. In certain preferred embodiments the replacement step is a drop-in replacement in the sense that no substantial redesign of the system is required and no major item of equipment needs to be replaced in order to accommodate the composition of the present invention as the heat transfer fluid. In certain preferred embodiments, the methods comprise a drop-in replacement in which the capacity of the system is at least about 70%, preferably at least about 85%, even more preferably at least about 90%, and even more preferably at least about 95% of the system capacity prior to replacement, and preferably not greater than about 130%, even more preferably less than about 115%, even more preferably less than about 110%, and even more preferably less than about 105%. In certain preferred embodiments, the methods comprise a drop-in replacement in which the suction pressure and/or the discharge pressure of the system, and even more preferably both, is/are at least about 70%, more preferably at least about 90% and even more preferably at least about 95% of the suction pressure and/or the discharge pressure prior to replacement, and preferably not greater than about 130%, even more preferably less than about 115, even more preferably less than about 110%, and even more preferably less than about 105%. In certain preferred embodiments, the methods comprise a drop-in replacement in which the mass flow of the system is at least about 80%, even more preferably at least 90%, and even more preferably at least 95% of the mass flow prior to replacement, and preferably not greater than about 130%, even more preferably less than about 115, even more preferably less than about 110%, and even more preferably less than about 105%.

In certain other preferred embodiments, the refrigeration compositions of the present invention may be used in refrigeration systems containing a lubricant used conventionally with R-410A, such as polyolester oils, and the like, or may be used with other lubricants traditionally used with HFC refrigerants, as discussed in greater detail above. As used herein the term "refrigeration system" refers generally to any system or apparatus, or any part or portion of such a system or apparatus, which employs a refrigerant to provide heating or cooling. Such air refrigeration systems include, for example, air conditioners, electric refrigerators, chillers, or any of the systems identified herein or otherwise known in the art.

EXAMPLES

The following examples are provided for the purpose of illustrating the present invention but without limiting the scope thereof.

Example 1

Performance

The following examples are provided for the purpose of illustrating the present invention but without limiting the scope thereof.

A representative air-to-air reversible heat pump designed for R410A was tested. This ducted unit was tested in Honeywell's Buffalo, N.Y. application laboratory. The ducted unit is a 3-ton (10.5 kW cooling capacity) 13 SEER (3.8 cooling seasonal performance factor, SPF) with a heating capacity of 10.1 kW and an HSPF of 8.5 (rated heating SPF of ~2.5), equipped with a scroll compressor. This system has tube-and-fin heat exchangers, reversing valves and thermostatic expansion valves for each operating mode. Due to the different pressures and densities of the refrigerants tested, some of the tests required the use of Electronic Expansion Valves (EEV) to reproduce the same degrees of superheat observed with the original refrigerants.

Tests shown in tables 1 and 2 were performed using standard [AHRI, 2008] operating conditions. All tests were performed inside environmental chambers equipped with instrumentation to measure both air-side and refrigerant-side parameters. Refrigerant flow was measured using a coriolis flow meter while air flow and capacity was measured using an air-enthalpy tunnel designed according to industry standards [ASHRAE, 1992]. All primary measurement sensors were calibrated to ±0.25° C. for temperatures and ±0.25 psi for pressure. Experimental uncertainties for capacity and efficiency were on average ±5%. Capacity values represent the air-side measurements, which were carefully calibrated using the reference fluid (R-410A). The developmental blend, L-41 was tested in this heat pump in both cooling and heating modes along with the baseline refrigerant R-410A.

TABLE 1

Standard Operating Conditions in Cooling Mode
Operating Conditions (Cooling Mode)

| Test Condition | Indoor Ambient | | Outdoor Ambient | |
|---|---|---|---|---|
| | DB(° C.)* | WB(° C.)* | DB(° C.)* | WB(° C.)* |
| AHRI Std. A | 26.7 | 19 | 35 | 24 |
| AHRI Std. B | 26.7 | 19 | 27.8 | 18 |
| AHRI Std. MOC | 26.7 | 19 | 46.1 | 24 |

*DB refers to Dry Bulb temperature and WB refers to Wet Bulb temperature throughout the tables

TABLE 2

Standard Operating Conditions in Heating Mode
Operating Conditions (Heating Mode)

| Test Condition | Indoor Ambient | | Outdoor Ambient | |
|---|---|---|---|---|
| | DB(° C.) | WB(° C.) | DB(° C.) | WB(° C.) |
| AHRI Std. H1 | 21.1 | 15.6 | 8.3 | 6.1 |
| AHRI Std. H3 | 21.1 | 15.6 | −8.3 | −9.4 |

TABLE 3

Capacity Evaluations

| | | | | Capacity in Heating Mode | | Capacity in |
|---|---|---|---|---|---|---|
| | Characteristics | | | | Low | Cooling Mode |
| Refrigerant | Comp | GWP | Glide Ev | Rating (H1) | Temperature (H3) | Rating (A) |
| R410A | R32/R125(50/50) | 2088 | | 100% | 100% | 100% |
| R32 | R32 (100) | 675 | 0 | 105% | 102% | 108% |
| HDR-89 | R32/1234ze (68/32) | 459 | 4.4 | 93% | 90% | 95% |
| HDR-89 (*) | R32/1234ze (68/32) | 459 | 4.4 | 101% | 98% | 101% |
| HDR-92 | R32/1234ze/R125 (68/26/6) | 669 | 3.8 | 96% | — | 96% |
| HDR-92(*) | R32/1234ze/R125 (68/26/6) | 669 | 3.8 | 104% | 105% | 104% |
| HDR-95(*) | R32/1234ze/R125 (68/28/4) | 600 | 4.0 | 103% | 103% | 103% |

Lower amounts of R32 increase glide (HDR-89), which affects performance in heating mode especially at the low temperature condition (H3). This happens even after full capacity recovery at standard operating conditions (A and H1). Adding R125 (HDR-92) reduces glide, making a better heat transfer fluid. This allows full capacity recovery in all operating conditions. This is also valid for a blend containing smaller amounts of R125 (HDR-95), which also experiences capacity recovery in the whole range.

TABLE 4

Efficiency

| | | | | Efficiency in | Efficiency in |
|---|---|---|---|---|---|
| | Characteristics | | | Heating Mode | Cooling Mode |
| Refrigerant | Comp | GWP | Glide Ev | Rating (H1) | Rating (B) |
| R410A | R32/R125(50/50) | 2088 | | 100% | 100% |
| R32 | R32 (100) | 675 | 0 | 100% | 101% |
| HDR-89 | R32/1234ze (68/32) | 459 | 4.4 | 103% | 103% |
| HDR-89 (*) | R32/1234ze (68/32) | 459 | 4.4 | 100% | 100% |
| HDR-92 | R32/1234ze/R125 (68/26/6) | 669 | 3.8 | 103% | 102% |
| HDR-92(*) | R32/1234ze/R125 (68/26/6) | 669 | 3.8 | 101% | 100% |
| HDR-95(*) | R32/1234ze/R125 (68/28/4) | 600 | 4.0 | 101% | 100% |

All refrigerants maintain efficiency after capacity recovery

TABLE 5

Reliability at extreme operating conditions (AHRI MOC)

| | Characteristics | | | Discharge Temperature |
|---|---|---|---|---|
| Refrigerant | Comp | GWP | Glide Ev | (Deg C.) Rating (H1) |
| R410A | R32/R125(50/50) | 2088 | | 95.5 |
| R32 | R32 (100) | 675 | 0 | 119.4 |
| HDR-89 | R32/1234ze (68/32) | 459 | 4.4 | 107.7 |
| HDR-89 (*) | R32/1234ze (68/32) | 459 | 4.4 | 112.2 |
| HDR-92 | R32/1234ze/R125 (68/26/6) | 669 | 3.8 | 107.2 |
| HDR-92(*) | R32/1234ze/R125 (68/26/6) | 669 | 3.8 | 108.8 |
| HDR-95(*) | R32/1234ze/R125 (68/28/4) | 600 | 4.0 | 108.8 |

The AHRI MOC condition tests the equipment at extreme ambient temperatures to verify that all parameters do not exceed the design limits for the equipment. One of the important parameters is the discharge temperature, which should lower than 115 deg C if the current compressor technologies are used.

Table 5 shows clearly that compositions containing lower amount of R32 (example: HDR92 with 68% ±2%) maintain this parameter inside the acceptable range.

Example 2

Burning Velocity

Applicants have found that the burning velocity of HFC/HFO mixtures compositions is typically and substantially linearly related to the weight averaged burning velocity of the components according to the Formula I:

$$BVcomp = \Sigma(wt\% \; i \cdot BVi)$$

where BVcomp is the burning velocity of the composition, and i is summed for each of the above listed components in the composition, and preferably the amounts of each of the above listed components are selected to ensure that BV is less than about 10, more preferably less than about 4, as refrigerants with such low BV exhibit unstable flames.

The burning velocities of common pure component refrigerants are given in the following Table 6.

TABLE 6

Burning velocities of pure components

| Refrigerant | BV, cm/s |
|---|---|
| HFC-32 | 6.7 |
| HFC-125 | 0 |
| 1234yf | 1.5 |
| 1234ze(E) | 0 |

The burning velocities of all the mixtures in Table 7 were calculated and using the linear relationship, above. All of the mixtures have a burning velocity of less than 10 cm/s and therefore would be expected to be classified as A2L refrigerants. When tested, however, blends containing small amounts of R125 exhibit unexpected low burning velocities, not predicted by the linear relationship.

TABLE 7

Burning velocity of mixtures

| Name | Calculated BV (cm/s) | Measured BV (cm/s) |
|---|---|---|
| R32 | | 6.7 |
| 1234ze | | 0 |
| 1234yf | | 1.5 |
| HDR-89 R32/1234ze(68/32) | 4.5 | 4.5 ± 0.3 |
| HDR-92 R32/1234ze/R125 (68/26/6) | 6.5 | ~2 |
| HDR-95 R32/1234ze/R125 (68/28/4) | 6.5 | ~2 |

Example 3

Hazard Evaluations

The Cube Test is performed pursuant to the procedure described herein. Specifically, each material being tested is separately released into a transparent cube chamber which has an internal volume of 1 ft$^3$. A low power fan is used to mix components. An electrical spark with enough energy to ignite the test fluids is used. The results of all tests are recorded using a video camera. The cube is filled with the composition being tested so as to ensure a stoichiometric concentration for each refrigerant tested. The fan is used to mix the components. Effort is made to ignite the fluid using the spark generator for 1 min. Record the test using HD camcorder.

As also mentioned above, the compositions of the present invention should exhibit a degree of hazard value as low as possible. As used herein, degree of hazardousness is measured by observing the results of a cube test using the composition in question and applying a value to that test as indicated by the guidelines provided in the table below.

HAZARD VALUE GUIDELINE TABLE

| TEST RESULT | HAZARD VALUE RANGE |
|---|---|
| No ignition). Exemplary of this hazard level are the pure materials R-134a and transHFO-1234ze. | 0 |
| Incomplete burning process and little or no energy imparted to indicator balls and no substantial pressure rise in the cube (all balls rise an amount that is barely observable or not all from the cube holes and essentially no movement of the cube observed). Exemplary of this hazard level is the pure material HFO-1234yf, with a value of 2. | 1-2 |
| Substantially complete burning process and low amount of energy imparted to some of the balls and substantially no pressure rise in the the cube (some balls rise an observable small distance and return to the starting position, and essentially no movement of the cube observed). ). Exemplary of this hazard level is the pure material R-32, with a value of 4. | 3-5 |
| Substantially complete burning process and substantial amount of energy imparted to most balls and high pressure rise in the cube but little or no movement of the cube (most balls rise an observable distance and do not return to the top of the cube, but little or no movement of the cube observed). | 6-7 |
| High Hazard Conditions-Rapid burning and substantial imparted to all balls and substantial energy imparted to the cube (substantially all balls rise from the cube and do not return to the starting position, and substantial movement of the cube observed). ). Exemplary of this hazard level are the pure materials R-152a and R-600a, with values of 8 and 10 respectively. | 8-10 |

The Hazardous rating of all the mixtures were calculated and are shown below in Table 8. All of the mixtures have a hazard rating of less than 7 and therefore would be expected to be safely used in air conditioning systems.

TABLE 8

Hazard Value of mixtures

| Name | Hazard |
|---|---|
| R32 | 4 |
| 1234ze | 0 |
| 1234yf | 2 |
| HDR-89 R32/1234ze(68/32) | 4 |
| HDR-92 R32/1234ze/R125 (68/26/6) | 2 |
| HDR-95 R32/1234ze/R125 (68/28/4) | 2 |

Those skilled in the art will appreciate that the foregoing description and examples are intended to be illustrative of the invention but not necessarily limiting of the full and true broad scope of the invention, which will be represented by the appended claims as presented now or hereinafter.

Example 4

Performance in Stationary Refrigeration (Commercial Refrigeration)—Medium Temperature Applications The performance of some preferred compositions were evaluated against other refrigerant compositions at conditions typical of medium temperature refrigeration. This application covers the refrigeration of fresh food. The conditions at which the compositions were evaluated are shown in Table 9:

TABLE 9

| Evaporating Temperature | 20° F. (−6.7° C.) |
|---|---|
| Condensing Temperature | 110° F. (43.3° C.) |
| Evaporator Superheat | 10° F. (5.5° C.) |
| Condenser Subcooling | 9° F. (5° C.) |

TABLE 9-continued

| Compressor Displacement | 1.0 ft³/min (0.028 m³/min) |
| --- | --- |
| Compressor Isentropic Eff. | 65% |
| Compressor Return Temp | 45° F. (7.2° C.) |

Table 10 compares compositions of interest to the baseline refrigerant, R-410A, a 50/50 near-azeotropic blend of R-32 and R-125 in typical medium temperature application.

TABLE 10

| Name | Composition | Capacity Rel. to R-410A | Efficiency Rel. to R-410A | Capacity with Increased Displ. |
| --- | --- | --- | --- | --- |
| HDR-92 | 32/1234ze/125 (68/26/6) | 91% | 104% | 102% |
| HDR-95 | 32/1234ze/125 (68/28/4) | 90% | 104% | 101% |

As can be seen, the compositions exceed the efficiency of the baseline refrigerant, R-410A and are within 10% of the capacity. In addition with a modest 12% increase in the displacement of the compressor, equivalent capacity is reached.

Example 5

Performance in Stationary Refrigeration (Commercial Refrigeration)—Low Temperature Applications The performance of some preferred compositions were evaluated against other refrigerant compositions at conditions typical of low temperature refrigeration. This application covers the refrigeration of frozen food. The conditions at which the compositions were evaluated are shown in Table 11:

TABLE 11

| Evaporating Temperature | −15° F. (−26.1° C.) |
| --- | --- |
| Condensing Temperature | 110° F. (43.3° C.) |
| Evaporator Superheat | 10° F. (5.5° C.) |
| Condenser Subcooling | 9° F. (5° C.) |
| Compressor Displacement | 1.0 ft³/min (0.028 m³/min) |
| Compressor Isentropic Eff. | 65% |
| Compressor Return Temp | 30° F. (−1.1° C.) |

Table 12 compares compositions of interest to the baseline refrigerant, R-410A, a 50/50 near-azeotropic blend of R-32 and R-125 in typical medium temperature application.

TABLE 12

| Name | Composition | Capacity Rel. to R-410A | Efficiency Rel. to R-410A | Capacity with Increased Displ. |
| --- | --- | --- | --- | --- |
| HDR-92 | 32/1234ze/125 (68/26/6) | 91% | 105% | 102% |
| HDR-95 | 32/1234ze/125 (68/28/4) | 90% | 105% | 100% |

As can be seen, the compositions again exceed the efficiency of the baseline refrigerant, R-410A and are within 10% of the capacity. In addition with a modest 12% increase in the displacement of the compressor, equivalent capacity is reached at low temperature conditions.

Example 6

Miscibility with Common Compressor Lubricants

One of the compositions of interest, HDR-95 (68% R-32/ 28% R-1234ze(E)/4% R-125) was experimentally evaluated to determine its miscibility with a lubricant supplied by Emerson's Copeland division termed "Ultra 22" POE lubricant that has a viscosity of 22 cSt at 40° C. It showed a marked improvement over pure R-32 which was immiscible over this range tested (−40° C. to 70° C.) except for small quantities of refrigerant (<5% refrigerant in oil between 12° C. and 62° C.). The 73% R-32 / 27% 1234ze(E) blend was miscible between −5° C. to 65° C. but HDR-95 showed miscibility down to −10° C. and up to 75° C. for all concentrations and it showed miscibility down to −30° C. for 5% refrigerant in oil. This improved miscibility at low temperature is especially important for heat pump and refrigeration applications.

What is claimed is:

1. A heat transfer composition comprising:
   (a) from about 60% to about 70% by weight of HFC-32;
   (b) from about 20% to about 40% by weight of HFO-1234ze; and
   (c) from greater than about 0% to about 10% by weight of HFC-125, provided that the amount of component (c) is effective to improve one or more of glide of the composition; heating capacity of the composition, burning velocity of the composition; and/or hazard value of the composition.

2. The heat transfer composition of claim 1, wherein said component (b) further comprises a compound, other than HFO-1234ze, selected from unsaturated —CF3 terminated propenes, unsaturated —CF3 terminated butenes, and combinations of these.

3. The heat transfer composition of claim 1, comprising from about 63% to about 69% by weight of HFC-32; from about 25% to about 37% by weight of HFO-1234ze; and from greater than about 0% to about 6% by weight of HFC-125.

4. The heat transfer composition of claim 1, comprising from about 1% to about 8% by weight of HFC-125.

5. The heat transfer composition of claim 1, comprising from about 1% to about 6% by weight of HFC-125.

6. The heat transfer composition of claim 1, comprising from about 3% to about 8% by weight of HFC-125.

7. The heat transfer composition of claim 1, comprising from about 3% to about 6% by weight of HFC-125.

8. A refrigerant composition comprising:
   (a) from about 60% to about 70% by weight of HFC-32;
   (b) from about 20% to about 40% by weight of HFO-1234ze; and
   (c) from greater than about 0% to about 10% by weight of HFC-125, provided that the amount of component (c) is effective to improve one or more of glide of the composition; heating capacity of the composition, particularly at low temperature conditions;

burning velocity of the composition; and/or hazard value of the composition.

9. The refrigerant composition of claim 8, comprising from about 63% to about 69% by weight of HFC-32; from about 25% to about 37% by weight of HFO-1234ze; and from greater than about 0% to about 6% by weight of HFC-125.

10. The refrigerant composition of claim 8, comprising from about 1% to about 8% by weight of HFC-125.

11. The refrigerant composition of claim 8, comprising from about 1% to about 6% by weight of HFC-125.

12. The refrigerant composition of claim 8, comprising from about 3% to about 8% by weight of HFC-125.

13. The refrigerant composition of claim 8, comprising from about 3% to about 6% by weight of HFC-125.

14. A method of replacing an existing heat transfer fluid contained in heat transfer system comprising removing at least a portion of said existing heat transfer fluid from said system, said existing heat transfer fluid being HFC-410A and replacing at least a portion of said existing heat transfer fluid by introducing into said system a heat transfer composition of claim 1.

15. A heat transfer system comprising a compressor, a condenser and an evaporator in fluid communication, and a heat transfer composition in said system, said heat transfer composition comprising the composition of claim 1.

16. The heat transfer system of claim 15 wherein said heat transfer system is selected from the group consisting of automotive air conditioning systems, residential air conditioning systems, commercial air conditioning systems, residential refrigerator systems, residential freezer systems, commercial refrigeration systems, commercial freezer systems, small refrigeration systems, stationary refrigeration systems, chiller air conditioning systems, chiller refrigeration systems, heat pump systems, and combinations of two or more of these.

17. A method of transferring heat to or from a fluid or body comprising causing a phase change in a composition of claim 1, and exchanging heat with said fluid or body during said phase change.

18. A refrigeration system comprising a composition in accordance with claim 1, said system being selected from the group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, heat pump systems, and combinations of two or more of these.

* * * * *